US012374335B2

(12) United States Patent
Bhowmik et al.

(10) Patent No.: US 12,374,335 B2
(45) Date of Patent: *Jul. 29, 2025

(54) LOCAL ARTIFICIAL INTELLIGENCE ASSISTANT SYSTEM WITH EAR-WEARABLE DEVICE

(71) Applicant: Starkey Laboratories, Inc., Eden Prairie, MN (US)

(72) Inventors: Achintya Kumar Bhowmik, Cupertino, CA (US); David Alan Fabry, Eden Prairie, MN (US); Amit Shahar, Hod HaSharon (IL); Justin R. Burwinkel, Eden Prairie, MN (US); Jeffrey Paul Solum, Greenwood, MN (US); Thomas Howard Burns, St. Louis Park, MN (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/534,321

(22) Filed: Dec. 8, 2023

(65) Prior Publication Data

US 2024/0105177 A1 Mar. 28, 2024

Related U.S. Application Data

(63) Continuation of application No. 17/585,256, filed on Jan. 26, 2022, now Pat. No. 11,869,505, which is a (Continued)

(51) Int. Cl.
*G10L 15/22* (2006.01)
*G10L 13/00* (2006.01)
(Continued)

(52) U.S. Cl.
CPC .............. *G10L 15/22* (2013.01); *G10L 13/00* (2013.01); *G10L 15/08* (2013.01); *G10L 15/30* (2013.01);
(Continued)

(58) Field of Classification Search
CPC ... A61B 5/02444; A61B 5/6817; G06F 3/017; G06F 3/04883; G06F 3/165; G06F 3/167;
(Continued)

(56) References Cited

U.S. PATENT DOCUMENTS 5,526,407 A 6/1996 Russell et al.
6,236,969 B1 5/2001 Ruppert et al.
(Continued)

FOREIGN PATENT DOCUMENTS

DE 10145994 4/2003
EP 2806618 11/2014
(Continued)

OTHER PUBLICATIONS

"International Preliminary Report on Patentability," for PCT Application No. PCT/US2020/012173 mailed Jul. 15, 2021 (8 pages).
(Continued)

*Primary Examiner* — Gerald Gauthier
(74) *Attorney, Agent, or Firm* — Pauly, DeVries Smith & Deffner LLC

(57) ABSTRACT

Embodiments herein relate to a local assistant system responding to voice input using an ear-wearable device. The system detects a wake-up signal and receives a first voice input communicating a first query content. The system includes speech recognition circuitry to determine the first query content, speech generation circuitry, and an input database of locally-handled user inputs. If the first audio input matches one of the locally-handled user inputs, then the system takes a local responsive action. If the first audio
(Continued)

input does not match one of the locally-handled user inputs, then the system transmits at least a portion of the first query content over a wireless network to a network resource.

20 Claims, 6 Drawing Sheets

Related U.S. Application Data continuation of application No. 16/732,821, filed on Jan. 2, 2020, now Pat. No. 11,264,029.

(60) Provisional application No. 62/788,814, filed on Jan. 5, 2019.

(51) Int. Cl.
  *G10L 15/08* (2006.01)
  *G10L 15/30* (2013.01)
  *H04R 1/10* (2006.01)

(52) U.S. Cl.
  CPC ......... *H04R 1/1016* (2013.01); *H04R 1/1041* (2013.01); *G10L 2015/088* (2013.01); *G10L 2015/223* (2013.01); *H04R 2420/07* (2013.01)

(58) Field of Classification Search
  CPC .......... G06F 17/00; G06F 17/16; G06F 17/22; G10L 13/00; G10L 15/08; G10L 15/22; G10L 15/30; G10L 2015/088; G10L 2015/223; G10L 17/00; G10L 17/22; H04L 63/0861; H04R 1/1016; H04R 1/1041; H04R 25/43; H04R 2201/107; H04R 2420/07; H04R 25/30; G06N 3/10; H04W 12/06; H04W 76/14
  See application file for complete search history.

(56) References Cited

U.S. PATENT DOCUMENTS

| | | | |
|---|---|---|---|
| 6,377,925 B1 | 4/2002 | Greene et al. | |
| 6,560,468 B1 | 5/2003 | Boesen | |
| 6,779,030 B1 | 8/2004 | Dugan et al. | |
| 6,879,698 B2 | 4/2005 | Boesen | |
| 7,512,414 B2 | 3/2009 | Jannard et al. | |
| 8,468,023 B1 | 6/2013 | Stracke | |
| 8,825,468 B2 | 9/2014 | Jacobsen et al. | |
| 9,129,291 B2 | 9/2015 | Goldstein et al. | |
| 9,167,356 B2 | 10/2015 | Higgins et al. | |
| 9,418,657 B2 | 8/2016 | Daniels | |
| 9,571,638 B1 | 2/2017 | Knighton et al. | |
| 9,674,341 B1 | 6/2017 | Pakidko et al. | |
| 9,740,686 B2 | 8/2017 | Johansson | |
| 9,848,273 B1 | 12/2017 | Helwani et al. | |
| 9,980,033 B2 | 5/2018 | Boesen | |
| 9,992,316 B2 | 6/2018 | Hardi | |
| 10,045,110 B2* | 8/2018 | Razouane ............... G10L 17/22 | |
| 10,051,364 B2 | 8/2018 | Kim et al. | |
| 10,219,063 B1 | 2/2019 | Valenzuela et al. | |
| 10,224,057 B1 | 3/2019 | Chevrier | |
| 10,249,305 B2 | 4/2019 | Yu | |
| 10,332,513 B1 | 6/2019 | D'Souza et al. | |
| 10,601,980 B1 | 3/2020 | Engelke et al. | |
| 10,643,611 B2 | 5/2020 | Lindahl | |
| 10,777,202 B2 | 9/2020 | Mindlin et al. | |
| 10,916,159 B2 | 2/2021 | Shintani et al. | |
| 10,957,337 B2 | 3/2021 | Chen et al. | |
| 11,115,539 B2 | 9/2021 | Yang et al. | |
| 11,264,029 B2* | 3/2022 | Bhowmik ............ H04R 1/1041 | |
| 11,264,035 B2 | 3/2022 | Bhowmik et al. | |
| 11,382,561 B2* | 7/2022 | Vu ....................... A61B 5/6817 | |
| 11,869,505 B2* | 1/2024 | Bhowmik ............... G06F 3/167 | |
| 2005/0094776 A1 | 5/2005 | Haldeman et al. | |
| 2006/0034481 A1 | 2/2006 | Barzegar et al. | |
| 2006/0167687 A1 | 7/2006 | Kates | |
| 2008/0031475 A1 | 2/2008 | Goldstein | |
| 2008/0195394 A1 | 8/2008 | Francioli | |
| 2008/0253583 A1 | 10/2008 | Goldstein et al. | |
| 2008/0319745 A1 | 12/2008 | Caldwell et al. | |
| 2009/0076804 A1 | 3/2009 | Bradford et al. | |
| 2009/0204410 A1 | 8/2009 | Mozer et al. | |
| 2010/0036667 A1 | 2/2010 | Byford et al. | |
| 2010/0222098 A1 | 9/2010 | Garg | |
| 2012/0078628 A1 | 3/2012 | Ghulman | |
| 2012/0215532 A1 | 8/2012 | Foo et al. | |
| 2012/0250836 A1 | 10/2012 | Engleke et al. | |
| 2012/0300965 A1 | 11/2012 | Samuels | |
| 2013/0054237 A1 | 2/2013 | Furman et al. | |
| 2013/0142365 A1 | 6/2013 | Lord et al. | |
| 2013/0144622 A1 | 6/2013 | Yamada et al. | |
| 2013/0343584 A1 | 12/2013 | Bennett et al. | |
| 2014/0122073 A1 | 5/2014 | Goldstein | |
| 2014/0163982 A1 | 6/2014 | Daborn et al. | |
| 2014/0236594 A1 | 8/2014 | Clarke et al. | |
| 2014/0369536 A1 | 12/2014 | Kirkwood et al. | |
| 2015/0036856 A1 | 2/2015 | Pruthi et al. | |
| 2015/0088501 A1 | 3/2015 | Recker | |
| 2015/0092971 A1* | 4/2015 | Kim ..................... H04R 25/30 381/328 | |
| 2015/0131814 A1 | 5/2015 | Usher et al. | |
| 2015/0139508 A1 | 5/2015 | Ye | |
| 2015/0168996 A1* | 6/2015 | Sharpe ................ H04L 63/0861 455/66.1 | |
| 2015/0169096 A1* | 6/2015 | Nishizawa ............. G06F 3/017 345/173 | |
| 2015/0170645 A1 | 6/2015 | Di Censo et al. | |
| 2015/0195789 A1 | 7/2015 | Yoon et al. | |
| 2015/0230022 A1 | 8/2015 | Sakai et al. | |
| 2015/0282227 A1 | 10/2015 | Yousef et al. | |
| 2015/0319546 A1 | 11/2015 | Sprague | |
| 2015/0364140 A1 | 12/2015 | Thörn | |
| 2017/0110124 A1* | 4/2017 | Boesen ............... G06F 3/04883 | |
| 2017/0111726 A1* | 4/2017 | Martin ................ G06F 3/04883 | |
| 2017/0155756 A1 | 6/2017 | Kim et al. | |
| 2017/0192743 A1* | 7/2017 | Chun ..................... H04W 76/14 | |
| 2017/0201613 A1 | 7/2017 | Engelke et al. | |
| 2017/0206914 A1 | 7/2017 | Engelke et al. | |
| 2017/0243582 A1 | 8/2017 | Menezes et al. | |
| 2017/0358317 A1 | 12/2017 | James | |
| 2018/0060031 A1 | 3/2018 | Boesen | |
| 2018/0063624 A1 | 3/2018 | Boesen | |
| 2018/0103859 A1 | 4/2018 | Provenzano | |
| 2018/0113673 A1* | 4/2018 | Sheynblat ............... G10L 17/00 | |
| 2018/0122025 A1 | 5/2018 | Boesen | |
| 2018/0124225 A1 | 5/2018 | Boesen et al. | |
| 2018/0132031 A1* | 5/2018 | Seo ..................... H04R 1/1016 | |
| 2018/0146307 A1 | 5/2018 | Petersen et al. | |
| 2018/0158365 A1 | 6/2018 | Roche | |
| 2018/0184203 A1 | 6/2018 | Piechowiak et al. | |
| 2018/0201226 A1 | 7/2018 | Falkson et al. | |
| 2018/0211658 A1 | 7/2018 | Segal et al. | |
| 2018/0227679 A1 | 8/2018 | Ungstrup et al. | |
| 2018/0279091 A1 | 9/2018 | Boesen et al. | |
| 2018/0317837 A1 | 11/2018 | Burwinkel et al. | |
| 2018/0325469 A1 | 11/2018 | Fountaine | |
| 2018/0336901 A1 | 11/2018 | Masaki et al. | |
| 2018/0341582 A1 | 11/2018 | Moon et al. | |
| 2018/0343527 A1 | 11/2018 | Edwards | |
| 2019/0007540 A1 | 1/2019 | Shaik et al. | |
| 2019/0090072 A1 | 3/2019 | Pedersen et al. | |
| 2019/0090135 A1 | 3/2019 | Milevski | |
| 2019/0268927 A1* | 8/2019 | Solum ..................... G06F 3/017 | |
| 2019/0335269 A1* | 10/2019 | O'Connor ............. G06F 17/16 | |
| 2019/0364352 A1 | 11/2019 | Khaleghimeybodi | |
| 2019/0371315 A1 | 12/2019 | Newendorp et al. | |
| 2019/0372893 A1 | 12/2019 | Zaslow et al. | |
| 2019/0378519 A1 | 12/2019 | Dunjic et al. | |
| 2020/0005028 A1 | 1/2020 | Gu | |
| 2020/0066264 A1 | 2/2020 | Kwatra et al. | |
| 2020/0077892 A1 | 3/2020 | Tran | |
| 2020/0104194 A1 | 4/2020 | Chalmers et al. | |
| 2020/0105251 A1 | 4/2020 | Meshram | |
| 2020/0137357 A1* | 4/2020 | Kapoustin ............. H04W 12/06 | |

(56) References Cited

U.S. PATENT DOCUMENTS

| | | | |
|---|---|---|---|
| 2020/0152185 A1 | 5/2020 | Usher et al. | |
| 2020/0174735 A1* | 6/2020 | Gomes | G06F 3/165 |
| 2020/0175976 A1 | 6/2020 | Rakshit et al. | |
| 2020/0219506 A1* | 7/2020 | Bhowmik | G10L 15/08 |
| 2020/0219515 A1* | 7/2020 | Bhowmik | H04R 25/43 |
| 2020/0251117 A1 | 8/2020 | Xu et al. | |
| 2020/0285443 A1 | 9/2020 | Yuan et al. | |
| 2020/0302292 A1* | 9/2020 | Tseng | G06N 3/10 |
| 2021/0073059 A1 | 3/2021 | Swildens | |
| 2021/0185458 A1* | 6/2021 | Solum | G06F 3/017 |
| 2021/0258703 A1 | 8/2021 | Wexler et al. | |
| 2022/0014623 A1 | 1/2022 | Engelke et al. | |
| 2022/0021985 A1 | 1/2022 | Wexler et al. | |
| 2022/0148597 A1* | 5/2022 | Bhowmik | H04R 1/1041 |
| 2022/0148599 A1 | 5/2022 | Bhowmik et al. | |
| 2022/0248153 A1 | 8/2022 | Burwinkel et al. | |
| 2022/0345836 A1* | 10/2022 | Solum | A61B 5/02444 |
| 2024/0105177 A1* | 3/2024 | Bhowmik | G10L 15/22 |

FOREIGN PATENT DOCUMENTS

| | | |
|---|---|---|
| EP | 2991372 | 3/2016 |
| WO | 2014190086 | 11/2014 |
| WO | 2016050724 | 4/2016 |
| WO | 2017134300 | 8/2017 |
| WO | 2020142679 | 7/2020 |
| WO | 2020142680 | 7/2020 |

OTHER PUBLICATIONS

"International Preliminary Report on Patentability," for PCT Application No. PCT/US2020/012174 mailed Jul. 15, 2021 (9 pages).

"International Search Report and Written Opinion," for PCT Application No. PCT/US2020/012173 mailed Mar. 23, 2020 (13 pages).

"International Search Report and Written Opinion," for PCT Application No. PCT/US2020/012174 mailed Apr. 6, 2020 (13 pages).

"Non-Final Office Action," for U.S. Appl. No. 16/732,756 mailed Jul. 7, 2021 (21 pages).

"Non-Final Office Action," for U.S. Appl. No. 16/732,821 mailed Jul. 15, 2021 (24 pages).

"Non-Final Office Action," for U.S. Appl. No. 17/585,227 mailed May 15, 2023 (15 pages).

"Non-Final Office Action," for U.S. Appl. No. 17/585,256 mailed May 17, 2023 (30 pages).

"Notice of Allowance," for U.S. Appl. No. 16/732,756 mailed Oct. 20, 2021 (13 pages).

"Notice of Allowance," for U.S. Appl. No. 16/732,821 mailed Oct. 22, 2021 (12 pages).

"Notice of Allowance," for U.S. Appl. No. 17/585,227 mailed Sep. 20, 2023 (17 pages).

"Notice of Allowance," for U.S. Appl. No. 17/585,256 mailed Aug. 30, 2023 (13 pages).

"Response to Non Final Office Action," for U.S. Appl. No. 16/732,756, filed Oct. 7, 2021 (13 pages).

"Response to Non Final Office Action," for U.S. Appl. No. 16/732,821, filed Oct. 7, 2021 (11 pages).

"Response to Non Final Office Action," for U.S. Appl. No. 17/585,227, filed Aug. 14, 2023 (10 pages).

"Response to Non Final Office Action," for U.S. Appl. No. 17/585,256, filed Aug. 14, 2023 (14 pages).

"Summons to Attend Oral Proceedings," for European Patent Application No. 20703104.8 mailed Dec. 22, 2023 (9 pages).

* cited by examiner

LOCAL ARTIFICIAL INTELLIGENCE ASSISTANT SYSTEM WITH EAR-WEARABLE DEVICE

This application is a Continuation of U.S. patent application Ser. No. 17/585,256, filed Jan. 26, 2022, which is a Continuation of U.S. patent application Ser. No. 16/732,821, filed Jan. 2, 2020, which claims the benefit of U.S. Provisional Application No. 62/788,814, filed Jan. 5, 2019, the content of which is herein incorporated by reference in its entirety.

FIELD

Embodiments herein relate to a system including an ear-wearable device for extracting query content from an audio input stream and identifying whether the query can be handled by local device and database resources.

SUMMARY

In a first aspect, a method of a local assistant system responds to voice input using an ear-wearable device, wherein the ear-wearable device includes a first speaker, a first microphone, a first processor, a first memory storage, and a first wireless communication device. The method includes detecting a wake-up signal, wherein the wake-up signal includes a vibration sequence can include a plurality of taps on the ear-wearable device or a keyword in an audio input stream. After detecting the wake-up signal, the system receives a first voice input communicating a first query content. The local assistant system includes: speech recognition circuitry programmed to recognize speech within the first voice input to determine the first query content, speech generation circuitry programmed to generate speech output to the first speaker of the ear-wearable device, and an input database stored in computer-readable memory including locally-handled user inputs. The system processes the first voice input to determine the first query content, and determines whether the first query content matches one of the locally-handled user inputs. If the first audio input matches one of the locally-handled user inputs, then the system takes a local responsive action. If the first audio input does not match one of the locally-handled user inputs, then the system transmits at least a portion of the first query content over a wireless network to a network resource.

In a second aspect, in addition to one or more of the preceding or following aspects, or in the alternative to some aspects, the local assistant responds to voice input using the ear-wearable device and a gateway device, wherein the gateway device includes a gateway processor, a gateway memory storage, a first gateway wireless communication device for communicating with the ear-wearable device, and a second gateway wireless communication device for communicating with a pervasive wireless network. The speech recognition circuitry, the speech generation circuitry, and the input database resides in the gateway device. The processing of the first voice input and the determining are performed by the local assistant system on the gateway device.

In a third aspect, in addition to one or more of the preceding or following aspects, or in the alternative to some aspects, the method can include: detecting, at a sensor of the ear-wearable device, biological information about a wearer of the ear-wearable device, wirelessly transmitting, by the ear-wearable device, to the gateway device, the biological information for storage at the gateway memory storage, identifying the biological information on the gateway memory storage in response to the first voice input, wherein the first query content is a bioinformatic request to report the biological information to the wearer, wherein the bioinformatic request is a locally-handled user input, formulating, by the gateway device, content for an audio response reporting the biological information, wirelessly transmitting an audio response to the ear-wearable device, and playing the audio response on the first speaker of the ear-wearable device to provide the biological information to the wearer.

In a fourth aspect, in addition to one or more of the preceding or following aspects, or in the alternative to some aspects, the wake-up signal includes the plurality of taps on the ear-wearable device being detected by the first microphone or by an inertial motion sensor in the ear-wearable device.

In a fifth aspect, in addition to one or more of the preceding or following aspects, or in the alternative to some aspects, wherein taking the local responsive action includes: obtaining locally-available information and providing an audio response on the ear-wearable device to provide the locally-available information to the user, or acting upon the ear-wearable device or another local device.

In a sixth aspect, in addition to one or more of the preceding or following aspects, or in the alternative to some aspects, the locally-handled user inputs include: a request to report on hardware functionality, a request to check battery power of the ear-wearable device, a request to check battery power of a local device, a request to check ear-wearable device functionality, a request to adjust a setting of a local device, a request to adjust a setting of the ear-wearable device, a request to adjust the volume of the ear-wearable device, a request for the ear-wearable device to block a sound, a request for the ear-wearable device to wirelessly pair to a local device, a request for a phone to wirelessly pair to another local device, a request to provide information based on locally-stored data, a request to provide a reminder from a calendar stored on a cellular phone, a request to provide content from a list, or a request to provide activity data.

In a seventh aspect, in addition to one or more of the preceding or following aspects, or in the alternative to some aspects, the local assistant system operates on the ear-wearable device, on the ear-wearable device and on a second ear-wearable device, on a gateway device that is in wireless communication with the ear-wearable device, or on a combination of these.

In an eighth aspect, a local assistant system for responding to voice input includes an ear-wearable device. The ear-wearable device can include a first speaker, a first microphone, a first processor, a first memory storage, and a first wireless communication device. The system includes detection circuitry programmed to detect a wake-up signal, wherein the wake-up signal includes a vibration sequence can include a plurality of taps on the ear-wearable device or a keyword in an audio input stream. The system further includes input circuitry programmed to, after detecting the wake-up signal, receive, at the local assistant system, a first voice input communicating a first query content. The system further includes speech recognition circuitry programmed to recognize speech within the first voice input to determine the first query content. The system further includes speech generation circuitry programmed to generate speech output to the speaker of the ear-wearable device. The system further includes an input database stored in computer-readable memory that stores locally-handled user inputs. The system further includes, triage circuitry to determine whether the first query content matches one of the locally-handled user inputs. The system further includes local response circuitry, programmed to, if the first audio input matches one of the locally-handled user inputs, then take a local responsive action, and network communication circuitry, configured to, if the first audio input does not match one of the locally-handled user inputs, transmit at least a portion of the first query content over a wireless network to a network resource.

In a ninth aspect, in addition to one or more of the preceding or following aspects, or in the alternative to some aspects, the system can further include: a gateway device can include a gateway processor, a gateway memory storage, a first gateway wireless communication device for communicating with the ear-wearable device, and a second gateway wireless communication device for communicating with a pervasive wireless network, wherein the speech recognition circuitry, the input database, and the triage circuitry resides in the gateway device.

In a tenth aspect, in addition to one or more of the preceding or following aspects, or in the alternative to some aspects, the ear-wearable device further includes a sensor configured to detect biological information about a wearer of the ear-wearable device, wherein the system is configured to: wirelessly transmit, by the ear-wearable device, to the gateway device, the biological information for storage at the gateway memory storage, identify the biological information on the gateway memory storage in response to the first voice input, wherein the first query content is a bioinformatic request to report the biological information to the wearer, wherein the bioinformatic request is a locally-handled user input, formulate, by the gateway device, content for an audio response reporting the biological information, wirelessly transmit an audio response to the ear-wearable device, and play the audio response on the first speaker of the ear-wearable device to provide the biological information to the wearer.

In an eleventh aspect, in addition to one or more of the preceding or following aspects, or in the alternative to some aspects, wherein the ear-wearable device includes an inertial motion sensor in communication with the detection circuitry.

In a twelfth aspect, in addition to one or more of the preceding or following aspects, or in the alternative to some aspects, wherein the wake-up signal includes the plurality of taps on the ear-wearable device being detected by the microphone or by an inertial motion sensor in the ear-wearable device.

In a thirteenth aspect, in addition to one or more of the preceding or following aspects, or in the alternative to some aspects, wherein the local response circuitry is further programmed to: obtain locally-available information and providing an audio response on the ear-wearable device to provide information to the user, or act upon the ear-wearable device, a local smart device, or another local device.

In a fourteenth aspect, in addition to one or more of the preceding or following aspects, or in the alternative to some aspects, wherein the locally-handled user inputs include: a request to report on hardware functionality, a request to check battery power of the ear-wearable device, a request to check battery power of a cellular phone, a request to check ear-wearable device functionality, a request to adjust a setting of a local device, a request to adjust a setting of the ear-wearable device, a request to adjust the volume of the ear-wearable device, a request for the ear-wearable device to block a sound, a request for the ear-wearable device to wirelessly pair to another device, a request for a phone to wirelessly pair to another device, a request to provide information based on locally-stored data, a request to provide a reminder from a calendar stored on a cellular phone, a request to provide content from a list, or a request to provide activity data.

In a fifteenth aspect, in addition to one or more of the preceding or following aspects, or in the alternative to some aspects, wherein the local assistant operates on the ear-wearable device, on the ear-wearable device and on a second ear-wearable device, on a gateway device that is coupled to the ear-wearable device, or on a combination of these.

In a sixteenth aspect, a method of a local assistant system responding to voice input uses a first ear-wearable device and a gateway device. The first ear-wearable device includes a first speaker, a first microphone, a first processor, a first memory storage, and a first wireless communication device. The gateway device includes a gateway processor, a gateway memory storage, a first gateway wireless communication device for communicating with the ear-wearable device, and a second gateway wireless communication device for communicating with a pervasive wireless network. The method includes detecting a wake-up signal, wherein the wake-up signal includes a vibration sequence can include a plurality of taps on the first ear-wearable device or a keyword in an audio input stream. After detecting the wake-up signal, the system receives, at the gateway device, a first voice input communicating a first query content. The gateway device further includes: speech recognition circuitry programmed to recognize speech within the first voice input to determine the first query content, speech generation circuitry programmed to generate content for speech output to the first speaker of the first ear-wearable device, and an input database stored in computer-readable memory can include locally-handled user inputs. The method includes processing, by the gateway device, the first voice input to determine the first query content, and determining, by the gateway device, whether the first query content matches one of the locally-handled user inputs. If the first audio input matches one of the locally-handled user inputs, then taking a local responsive action. If the first audio input does not match one of the locally-handled user inputs, then transmitting, by the gateway device, at least a portion of the first query content over a wireless network to a network resource.

In a seventeenth aspect, in addition to one or more of the preceding or following aspects, or in the alternative to some aspects, the method further can include detecting, at a first sensor of the first ear-wearable device, biological information about a wearer of the ear-wearable device, wirelessly transmitting, by the first ear-wearable device, to the gateway device, the biological information for storage at the gateway memory storage, identifying the biological information on the gateway memory storage in response to the first voice input, wherein the first query content is a bioinformatic request to report the biological information to the wearer, wherein the bioinformatic request is a locally-handled user input, formulating, by the gateway device, content for an audio response reporting the biological information, wirelessly transmitting the audio response to the ear-wearable device, and playing the audio response on the first speaker of the first ear-wearable device to provide the biological information to the wearer.

In an eighteenth aspect, in addition to one or more of the preceding or following aspects, or in the alternative to some aspects, the first ear-wearable device further includes a first inertial motion sensor. The local assistant system further includes a second ear-wearable device which includes a second speaker, a second microphone, and a second processor, a second memory storage, a second wireless communication device, and a second inertial motion sensor. The first query content is an adjustment request to adjust a setting of the first ear-wearable and second ear-wearable device, wherein the adjustment request is a locally-handled user input, wherein taking the local responsive action further includes: transmitting, by the gateway device to the first ear-wearable device and to the second ear-wearable device, a command to perform the adjustment request, adjusting, by the first ear-wearable device, the requested setting of the first ear-wearable device, and adjusting, by the second ear-wearable device, the requested setting of the second ear-wearable device.

In a nineteenth aspect, in addition to one or more of the preceding or following aspects, or in the alternative to some aspects, wherein the wake-up signal includes the plurality of taps on the ear-wearable device being detected by the first microphone or by an inertial motion sensor in the ear-wearable device.

In a twentieth aspect, in addition to one or more of the preceding or following aspects, or in the alternative to some aspects, wherein taking the local responsive action includes: obtaining locally-available information and providing an audio response on the ear-wearable device to provide the locally-available information to the user, or acting upon the ear-wearable device or another local device.

This summary is an overview of some of the teachings of the present application and is not intended to be an exclusive or exhaustive treatment of the present subject matter. Further details are found in the detailed description and appended claims. Other aspects will be apparent to persons skilled in the art upon reading and understanding the following detailed description and viewing the drawings that form a part thereof, each of which is not to be taken in a limiting sense. The scope herein is defined by the appended claims and their legal equivalents.

BRIEF DESCRIPTION OF THE FIGURES

Aspects may be more completely understood in connection with the following figures (FIGS.), in which.

Figure 1:
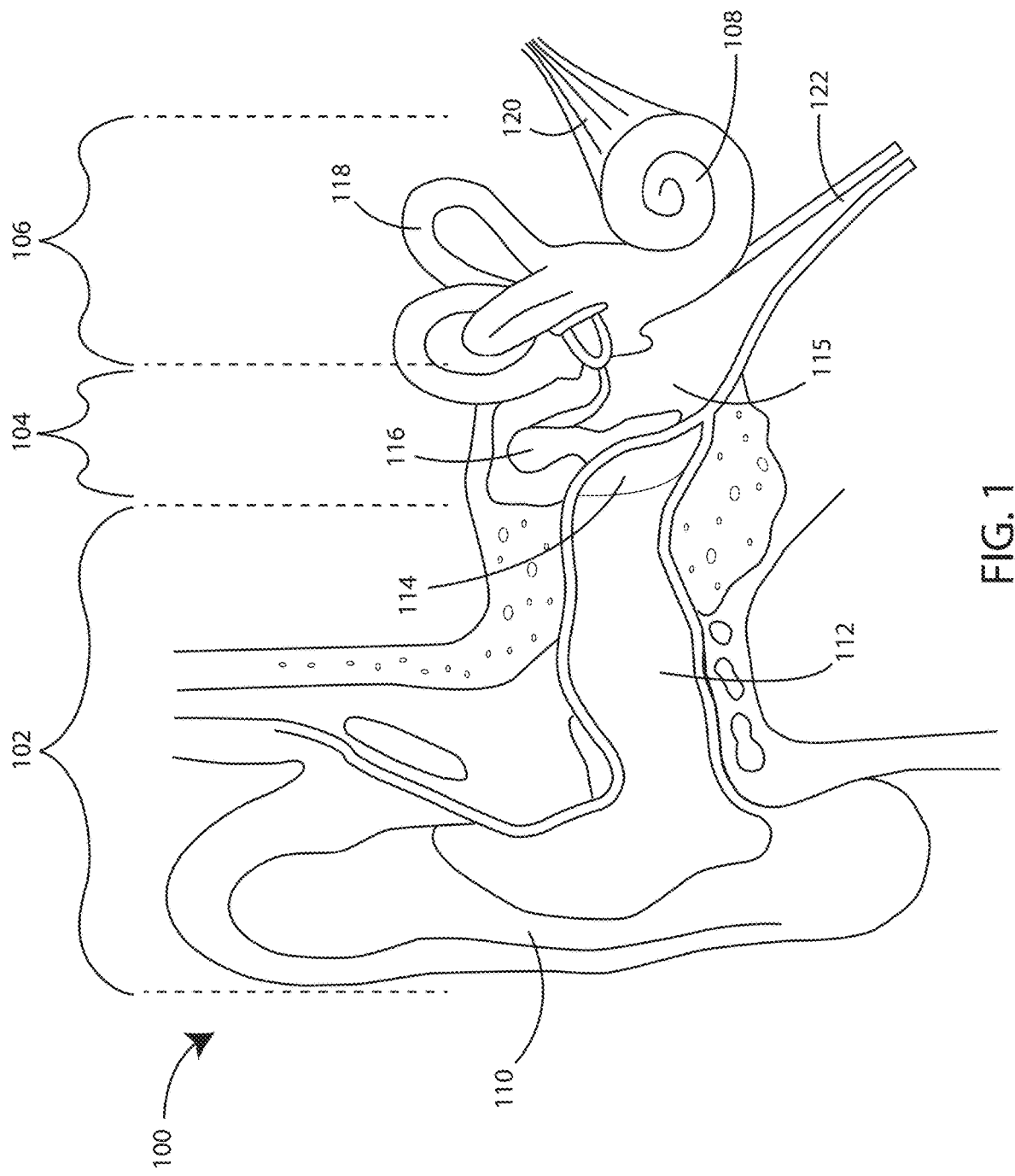
FIG. 1 is a partial cross-sectional view of ear anatomy.

While embodiments are susceptible to various modifications and alternative forms, specifics thereof have been shown by way of example and drawings, and, will be described in detail. It should be understood, however, that the scope herein is not limited to the particular aspects described. On the contrary, the intention is to cover modifications, equivalents, and alternatives falling within the spirit and scope herein.

DETAILED DESCRIPTION

An ear wearable device has a local assistant that can assist with various functions that relate to the device or the wearer. The assistant may operate without access to a network resource. The local assistant may, for example, use speech recognition techniques to interpret natural language requests (e.g., query or command) obtained using a microphone on the ear-wearable device. The local assistant may also interpret other inputs, such as mechanical tapping or touch, ambient light, biometric information (e.g., heart rate, temperature, activity or motion, connectivity, or location information. The local assistant may also triage a request to ascertain whether it is appropriate for the local assistant to respond to the query or command, or whether the query or command should be sent to a network resource, such as Alexa or Google.

A hearing aid user may want to access assistance when the hearing aid is not connected to a network. A local assistant provides assistant functionality even when a network connection is not available.

Some requests are appropriate for local resolution by an ear-wearable device, and some are appropriate for response by reference to a network resource. It is desirable for a user to be able to submit both types of requests (locally-handled or network-handled) through a single input interface.

The term "Query" is used to refer to a question or command that a user may pose to the local assistant system. The term "local" or "locally" is used to mean located or performed on the ear-wearable device, on the phone, a smartphone, wearable devices that are worn by the user, portable devices that are carried with the user as the user moves, or devices in the same location as the user. A locally-handled query can result in action without access to a cellular network.

Locally-Handled Queries

An ear-wearable device may have a local assistant that may assist with various functions that relate to the device or the wearer. Examples of local operation are providing answers to questions based on data already stored on a gateway device, smart device, or within the memory of the hearing device. Other examples of local operation are the collection, presentation, or reporting of biometric sensor information, such as reporting the heart rate of the wearer. Other examples of local operation are providing reminders from a list, a calendar, or another source of information. For example, the wearer can ask the local assistant system, "When should I take my medication?"

The local assistant system can respond with an audio response played at the ear-wearable device, such as, "Take your medication at 5 PM."

Other examples of local operation are providing information about current and past wearer activity information, current and past location information, or current and past device activity information. Examples of these types of queries include, "What day did John call me?", "When did we leave the restaurant?", and "Where did I leave my phone?"

Other examples of local operation are providing information based on interactions or logs of interactions with devices within a local area network or nodes of a mesh network. For example, the local assistant system can use a list of Bluetooth and mesh network node connections to allow the ear-wearable to understand movement within a space. These types of information can be correlated with activity tracking data, such as the number of steps, in order to provide the wearer with insights about their behavior.

Further examples of local operations that the local assistant can execute, in various embodiments include verification of hardware functionality, such as performing a device check, checking a battery level, checking a volume level, or checking a system setting. Other examples of local operations are the adjustment of a setting of an ear-wearable device, such as changing the volume of an ear-wearable device or blocking a noise using the ear-wearable device. Other examples of local operations are pairing the ear-wearable device, a gateway device, or a smart phone with each other or with other devices in the local environment. Another example of a local operation is authenticating a user's voice for remote authentication used for, for example, point of sale transactions, opening locks, enabling mobility such as for motorized vehicles, banking or other financial transactions, unlocking electronic devices such as phones, desktop computers, and laptop computers, making a connection to assistive listening devices, controlling local devices, in-home devices, and alarm systems, controlling mobility devices, such as cars, wheelchairs, or elevators, controlling home controls such as those regulating temperature, humidity, lighting, and door locks, sending voice and text messages to contacts, and sending messages and other biosensor information to healthcare professionals or responsible care givers.

The local assistant may operate on an ear-wearable device, or on a pair of ear-wearable devices, or on a portable device (e.g., smartphone or gateway device) that may be coupled (e.g., paired) to one or a pair of ear-wearable devices, or on a combination of these devices.

In an example where the local assistant may operate on a portable device (e.g., smart phone or gateway device), the gateway device may receive audio information, sensor information, or other information from one or more ear-wearable devices. The gateway device may receive a continuous, recurrent, periodic, or event-driven transmission of audio data, sensor data, or both, and may use this information to determine the nature of the request and formulate a response or action.

The gateway device may use its location services, call logs, and logs of available Bluetooth and other wireless networks to help provide the user with reminders. For example, the user can ask the device when they last received a call from a specific individual or when they last visited a specific location. The gateway device may also have access to offline data stored by various apps, such as calendars, lists, account information, or push notifications. The gateway device may stream text to audio from files stored on the gateway device. The gateway device could search previously received messages to find answers. For example, the user could query the system, "What did Mary say her new address is?" or "Where did Joe say to meet him?"

In another example, the local assistant may operate on an ear-wearable device and not need a separate gateway device to operate and respond to user queries. The ear-wearable device may receive information via a microphone or sensors on the ear-wearable device, or from a second ear-wearable device. The ear-wearable device may receive information from another wearable sensor (e.g., watch or smart glasses), in various embodiments. The ear-wearable device may also receive input from a portable device such as a smart phone.

The ear-wearable device could also provide information to the user based upon its wireless network connection logs or data logs relative to its acoustic classifier, location services, or both. For example, the user could ask the assistant when or where they last had their phone. The ear-wearable could know when connections to the phone were lost and provide the user with a list of places where they could look. In this embodiment, an example of a possible response to the user query is, "I lost connection to your phone at 11:35. You were near a Bank called TCF and a restaurant called McDonalds on Bayside Drive."

The ear-wearable could be periodically synced with important data that the user might need even when a cellular or internet connection is lost. For example, the user might want their medication routine or other reminders stored offline. In various embodiments, the system includes a user interface for determining which information should be stored in memory and how frequently to sync that information.

The assistant may operate without access to a network resource. For example, the local assistant may include a catalog of questions or responses or both, to which a request may be matched. The local assistant may, for example, use speech recognition techniques to interpret natural language request (e.g., query or command) obtained using a microphone on the ear-wearable device.

Inputs to the Local Assistant System

The ear-wearable device may receive audio information and execute speech recognition algorithms to interpret a request into an actionable response. The ear-wearable device may also interpret other inputs, such as mechanical tapping or touch, ambient light, motion, connectivity, location information, or biometric information, such as heart rate, temperature, or blood oxygen concentration.

In an example, a head nod detected by an inertial sensor (IMU) may be interpreted as an input for the local assistant. For example, a system may use a head nod to verify an interpretation of a question or to disambiguate verbal inputs or other stimuli. One example of such an exchange is:

User: "Call Jane."
Ear-Wearable Device: "Did you mean call Jane Smith?"
User: (Head nod)

In some examples, the local assistant may receive a command via a voice instruction. For example, the local assistant may enable a user to adjust volume, mode, or initiate a stream from a source, such as a source of music, or select a source using the user's voice.

In some examples, a device may stop an answer or cancel a request in response to a physical command, such as a double-tap. For example, the system can stop the response or action if the answer is too long or cancel a request to enable a different request. In addition, or in the alternative, a stop keyword is defined in the system. When the system detects that the user has spoken the stop keyword, the device stops the audio response or cancels an action.

Wake-Up Signal

In an example, an ear-wearable device may detect a predefine activation keyword or a defined sensor signal, such as a double-tap detected by a microphone or inertial motions sensor, and then activates the local assistant in response. The local assistant then receives a request via a microphone. The local assistant then determines whether the request should be handled locally (e.g., by the ear-wearable device, or a local device), or whether the query should be sent to a network resource. The request may be transmitted to a smart phone, and to the cloud, and then a response may be sent back to the ear-wearable device or to another device as an actionable stimulus.

In another example, the local assistant may be activated by a button press on the ear-wearable device, or on a remote-control device such as a smart device. In some examples, the local assistant may detect the end of a request or question based on a period of silence, or using a sensor input such as detection of a double-tap, different tap sequence, or button press.

In some examples, the local assistant may infer that the user is asking a question of themselves but that the local assistant may have additional information to provide. For example, a user may say "Oh, shoot! Where did I leave the remote?" The local assistant may respond, "You were streaming the television about an hour ago, then you took 10 steps towards the kitchen. Try looking there."

Triage of Queries

In various embodiments, the local assistant triages a request to ascertain whether it is appropriate for the local assistant to respond to the query or command, or whether the query or command should be sent to a network resource. For example, the local assistant system determines whether the first query content matches one of the locally-handled user inputs. Examples of network resources include the virtual digital assistant systems that are available on local device or over an internet interface. One example of a network resource is Alexa, a virtual digital assistant developed by Amazon.com, Inc., headquartered in Seattle, Washington, USA. Another example of a network resource is Google Assistant, a virtual digital assistant developed by Google LLC, headquartered in Mountain View, California, USA. Another example of a network resource is Siri, a virtual digital assistant developed by Apple Inc., headquartered in Cupertino, California, USA.

If local answers are not sufficient, the user may request the device to "Look online", or the device might prompt the user, "Would you like for me to try and find more information online?"

The local assistant could request network resources and work on providing an answer in parallel. The local assistant can compare the query against a list.

Methods of a Local Assistant System Responding to Voice Input

In one example, a method of a local assistant system responding to voice input uses an ear-wearable device. The ear-wearable device includes a first speaker, a first microphone, a first processor, a first memory storage, and a first wireless communication device. A wearer of the ear-wearable device takes an action to activate the local assistant system, such as tapping the device or speaking an activation keyword, then verbally states a query.

The system detects a wake-up signal to activate the local assistant system. The wake-up signal can be a vibration sequence including a plurality of taps on the ear-wearable device. The plurality of taps on the ear-wearable device can be detected by the first microphone or by an inertial motion sensor in the ear-wearable device. Alternatively, or in addition, the wake-up signal is a keyword in an audio input stream.

After detecting the wake-up signal, the system receives a first voice input communicating the query, which has a query content. The system processes the first voice input to determine the first query content using speech recognition circuitry. The system includes an input database stored in a computer-readable memory storage location that includes inputs that can be handled locally without accessing a network resource.

After determining the first query content, the system determines whether the first query content matches one of the locally-handled user inputs in the input database. If the first audio input matches one of the locally-handled user inputs, then the system takes a local responsive action. One example of a local responsive action is to provide locally-available information to the user by playing an audio response on the ear-wearable device. The system includes a speech generation circuit to generate the audio response.

Another example of a local responsive action is acting upon the ear-wearable device or another local device.

If the first audio input does not match one of the locally-handled user inputs, then the system transmits at least a portion of the first query content over a wireless network to a network resource.

In various example, the local assistant system operates on the ear-wearable device, on the ear-wearable device and on a second ear-wearable device, on a gateway device that is in wireless communication with the ear-wearable device, or on a combination of these.

In some examples, the local assistant responds to voice input using the ear-wearable device and a gateway device. The gateway device includes a gateway processor, a gateway memory storage, a first gateway wireless communication device for communicating with the ear-wearable device, and a second gateway wireless communication device for communicating with a pervasive wireless network. In some example, the speech recognition circuitry, the speech generation circuitry, and the input database resides in the gateway device, and the processing of the first voice input and the determining are performed by the gateway device.

In some examples, the local assistant system can audibly report on biological information of the wearer to the wearer. The input database of locally-handled user inputs includes one or more bioinformatic requests. The ear-wearable device includes a sensor capable of detecting biological information. Example of biological information that can be detected by the sensor includes heart rate, temperature, blood oxygen concentration, and other data. The system wirelessly transmits the biological information from the ear-wearable device to the gateway device for storage at the gateway memory storage. When the wearer poses a query about the biological information, in other words, a bioinformatic request that is a locally-handled user input, then the system identifies the requested biological information on the gateway memory storage. The system then formulates content for an audio response reporting the biological information and wirelessly transmits an audio response to the ear-wearable device. The ear-wearable device plays the audio response on the first speaker of the ear-wearable device to provide the biological information to the wearer.

Another example of a local responsive action is acting upon two ear-wearable devices to execute a command to perform an adjustment request. In one such example, the local assistant system transmits from the gateway device to the first ear-wearable device and to the second ear-wearable device, the command to perform the adjustment request. The first ear-wearable device adjusts the requested setting of the first ear-wearable device. The second ear-wearable device adjusts the requested setting of the second ear-wearable device.

Local Assistant System Components

In one example, a local assistant system for responding to voice input includes detection circuitry programmed to detect a wake-up signal, wherein the wake-up signal comprises a vibration sequence comprising a plurality of taps on the ear-wearable device or a keyword in an audio input stream. In this example, the system further includes input circuitry programmed to, after detecting the wake-up signal, receive a first voice input communicating a first query content. The system further includes speech recognition circuitry programmed to recognize speech within the first voice input to determine the first query content, speech generation circuitry programmed to generate speech output to the speaker of the ear-wearable device, and an input database stored in computer-readable memory comprising locally-handled user inputs. The system further includes triage circuitry to determine whether the first query content matches one of the locally-handled user inputs, local response circuitry, programmed to, if the first audio input matches one of the locally-handled user inputs, then take a local responsive action, and network communication circuitry, configured to, if the first audio input does not match one of the locally-handled user inputs, transmit at least a portion of the first query content over a wireless network to a network resource.

In one example, each of the components of the local assistant system are located on the ear-wearable device. In another example, some components of the local assistant system are on an ear-wearable device, some are on a gateway device, and some components, such as the detection circuitry and the local response circuitry, are partially on the ear-wearable device and partially on the gateway device.

Further Query Examples

An example question that can be posed to the local assistant system is, "What's the weather?"

In response, the local assistant accesses a network resource to get the information about the weather forecast.

Another example question is, "How do I clean my hearing aid?"

In response, a local assistant may have cleaning instructions locally stored and may provide an audio response containing the hearing aid cleaning instructions. Alternatively, the local assistant may know the model of the user's hearing aid and may use the model information to query a network resource to obtain the cleaning instructions.

Another example query is to ask for a change in the control mode of an ear-wearable device such as a hearing aid. In response, the ear-wearable device can use its microphone to detect the type of sound in the user's environment, characterize the user's environment, and then chose the most appropriate control mode for this environment. This type of control mode change can be accomplished by the local assistant without connecting to a pervasive area network such as a cellular network.

Another example query is to ask for directions to particular location. In response, the local assistant uses information about the user's current location and queries a network resource to obtain directions for the user.

Another example query is to ask the local assistant to add an item to a list, such as a shopping list, or to a note application, stored on a gateway device. The shopping list can be linked with a network resource that can facilitate ordering the item or adding the item to a shopping cart. The local assistant can also interface with a task list application on a gateway device. The user can ask for the next item on a task list, and the local assistant can respond by providing an audio response with speech generated to communicate the content of the next task.

The local assistant can be asked about the content of the user's calendar. One example of such a query is, "What's my next meeting?" The system can respond with an audio response with speech generated to communicate the content of the next task.

The local assistant system may use language translation or transcription features. Example commands include: Start transcription, Transcribe the last sentence, or Start translation from French to English. The system may access a buffer storage location to transcribe speech from the recent past.

The local assistant may also use a user's location, the time, the type of device including the features present on the ear-wearable device, current settings, information about the wearer, including age, medical diagnosis, or hearing attributes, to determine appropriate responses or to interpret the nature of a request. The local assistant may use contact information to carry out requests. One example of such a request is a request to send biological information to a contact.

The local assistant system may interpret context-relevant questions using context, such as the prior question, environmental information, or time. For example, when asked, "What is my next appointment?" and "And the next one?", the system can understand the second question in light of the previous question.

The local assistant system may perform account log-in using stored information, optionally encrypted. The local assistant may know the user preferences, such as restaurant preferences or preferences for types of food. For example, the local assistant could know that the user likes curry or does not like a specific restaurant, and can use this information in answering the query, Find me a good local restaurant.

The local assistant may use the user's current or recent activity information such as recent exercise to answer queries for activity-related advice. For example, after exercise, a user might ask for post-exercise information or advice or health information or advice, How many calories did I burn, How long did I work out, How long was I asleep, What's my recovery rate, or What is my heart rate variability.

The local assistant can send information about health or any other topic to a companion or to a companion application. The local assistant can use ambient audio information to answer queries such as, Did I snore, Did the doorbell ring, and Tell me when my flight is boarding. The local assistant can know information about travel such as flight number or departure time and can use a network resource, an airline app, ambient audio, or a combination thereof to answer travel-related questions.

The local assistant may execute an automatic hearing test and may provide audio queues to walk user through the testing.

Ear-Wearable Device or Hearing Assistance Device (FIG. 1-4)

The term "ear-wearable device" shall refer to devices worn on or in the ear that can aid a person with hearing, such as a hearing assistance device. The term "hearing assistance device" as used herein shall refer to devices that can aid a person with impaired hearing. The term "hearing assistance device" shall also refer to devices that can produce optimized or processed sound for persons with normal hearing. Hearing assistance devices herein can include hearables (e.g., wearable earphones, headphones, earbuds, virtual reality headsets), hearing aids (e.g., hearing instruments), cochlear implants, and bone-conduction devices, for example. Hearing assistance devices include, but are not limited to, behind-the-ear (BTE), in-the ear (ITE), in-the-canal (ITC), invisible-in-canal (IIC), receiver-in-canal (RIC), receiver in-the-ear (RITE) or completely-in-the-canal (CIC) type hearing assistance devices or some combination of the above. In some embodiments herein, a hearing assistance device may also take the form of a piece of jewelry, including the frames of glasses, that may be attached to the head on or about the ear.

Referring now to FIG. 1, a partial cross-sectional view of ear anatomy 100 is shown. The three parts of the ear anatomy 100 are the outer ear 102, the middle ear 104 and the inner ear 106. The inner ear 106 includes the cochlea 108. The outer ear 102 includes the pinna 110, ear canal 112, and the tympanic membrane 114 (or eardrum). The middle ear 104 includes the tympanic cavity 115, auditory bones 116 (malleus, incus, stapes) and the semicircular canals 118. The inner ear 106 includes the cochlea 108, and the auditory nerve 120. The pharyngotympanic tube 122 is in fluid communication with the Eustachian tube and helps to control pressure within the middle ear generally making it equal with ambient air pressure.

Sound waves enter the ear canal 112 and make the tympanic membrane 114 vibrate. This action moves the tiny chain of auditory bones 116 (ossicles—malleus, incus, stapes) in the middle ear 104. The last bone in this chain contacts the membrane window of the cochlea 108 and makes the fluid in the cochlea 108 move. The fluid movement then triggers a response in the auditory nerve 120.

Hearing assistance devices, such as hearing aids and hearables (e.g., wearable earphones), can include an enclosure, such as a housing or shell, within which internal components are disposed. Components of a hearing assistance device herein can include a control circuit, digital signal processor (DSP), memory (such as non-volatile memory), power management circuitry, a data communications bus, one or more communication devices (e.g., a radio, a near-field magnetic induction device), one or more antennas, one or more microphones, a receiver/speaker, and various sensors as described in greater detail below. More advanced hearing assistance devices can incorporate a long-range communication device, such as a Bluetooth® transceiver or other type of radio frequency (RF) transceiver.

Figure 2:
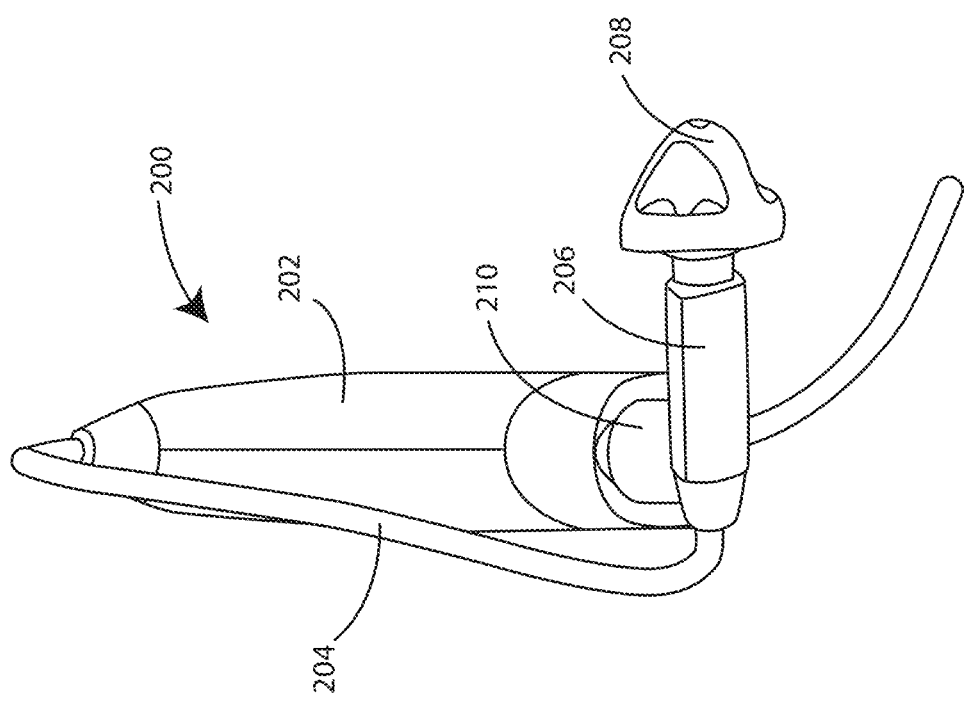
FIG. 2 is a schematic view of a hearing assistance device in accordance with various embodiments herein.

Referring now to FIG. 2, a schematic view of a hearing assistance device 200 is shown in accordance with various embodiments herein. The hearing assistance device 200 can include a hearing assistance device housing 202. The hearing assistance device housing 202 can define a battery compartment 210 into which a battery can be disposed to provide power to the device. The hearing assistance device 200 can also include a receiver 206 adjacent to an earbud 208. The receiver 206 an include a component that converts electrical impulses into sound, such as an electroacoustic transducer, speaker, or loud speaker. A cable 204 or connecting wire can include one or more electrical conductors and provide electrical communication between components inside of the hearing assistance device housing 202 and components inside of the receiver 206.

The hearing assistance device 200 shown in FIG. 2 is a receiver-in-canal type device and thus the receiver is designed to be placed within the ear canal. However, it will be appreciated that may different form factors for hearing assistance devices are contemplated herein. As such, hearing assistance devices herein can include, but are not limited to, behind-the-ear (BTE), in-the ear (ITE), in-the-canal (ITC), invisible-in-canal (ITC), receiver-in-canal (RIC), receiver in-the-ear (RITE) and completely-in-the-canal (CIC) type hearing assistance devices. Aspects of hearing assistance devices and functions thereof are described in U.S. Pat. No. 9,848,273; U.S. Publ. Pat. Appl. No. 20180317837; and U.S. Publ. Pat. Appl. No. 20180343527, the content of all of which is herein incorporated by reference in their entirety.

Hearing assistance devices of the present disclosure can incorporate an antenna arrangement coupled to a high-frequency radio, such as a 2.4 GHz radio. The radio can conform to an IEEE 802.11 (e.g., WiFi®) or Bluetooth® (e.g., BLE, Bluetooth® 4.2 or 5.0, and Bluetooth® Long Range) specification, for example. It is understood that hearing assistance devices of the present disclosure can employ other radios, such as a 900 MHz radio. Hearing assistance devices of the present disclosure can be configured to receive streaming audio (e.g., digital audio data or files) from an electronic or digital source. Hearing assistance devices herein can also be configured to switch communication schemes to a long-range mode of operation, wherein, for example, one or more signal power outputs may be increased, and data packet transmissions may be slowed or repeated to allow communication to occur over longer distances than that during typical modes of operation. Representative electronic/digital sources (also serving as examples of accessory devices herein) include an assistive listening system, a TV streamer, a radio, a smartphone, a cell phone/entertainment device (CPED), a pendant, wrist-worn device, or other electronic device that serves as a source of digital audio data or files.

Figure 3:
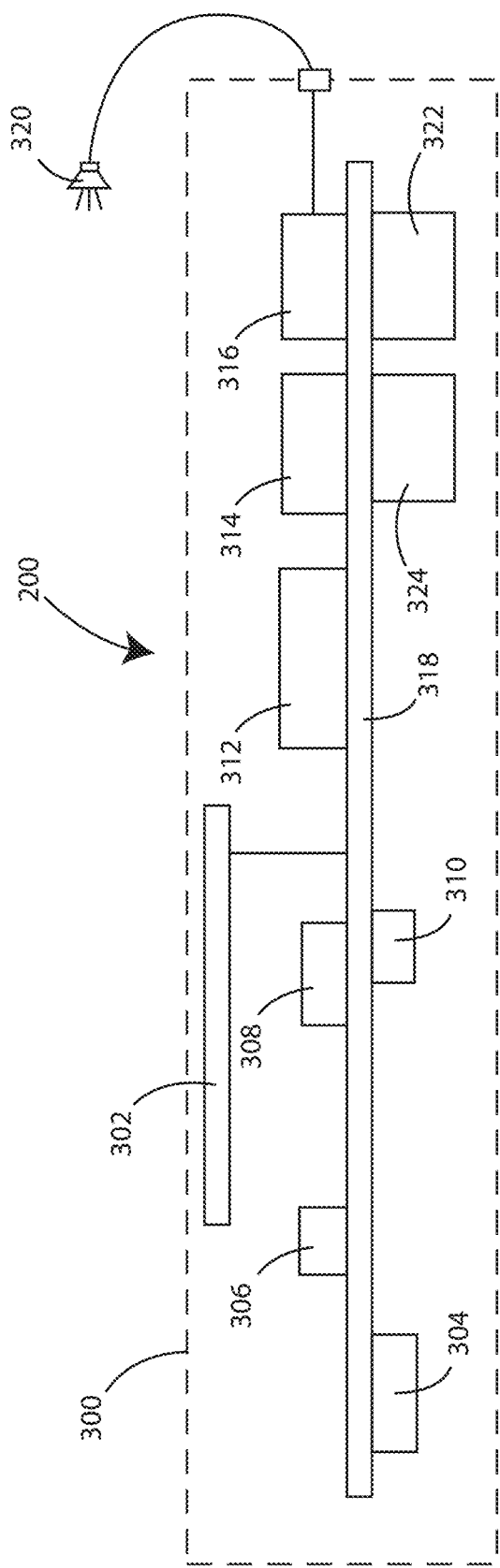
FIG. 3 is a schematic view of various components of a hearing assistance device in accordance with various embodiments herein.

Referring now to FIG. 3, a schematic block diagram is shown with various components of a hearing assistance device in accordance with various embodiments. The block diagram of FIG. 3 represents a generic hearing assistance device for purposes of illustration. The hearing assistance device 200 shown in FIG. 3 includes several components electrically connected to a flexible mother circuit 318 (e.g., flexible mother board) which is disposed within housing 300. A power supply circuit 304 can include a battery and can be electrically connected to the flexible mother circuit 318 and provides power to the various components of the hearing assistance device 200. One or more microphones 306 are electrically connected to the flexible mother circuit 318, which provides electrical communication between the microphones 306 and a digital signal processor (DSP) 312. Among other components, the DSP 312 incorporates or is coupled to audio signal processing circuitry configured to implement various functions described herein. A sensor package 314 can be coupled to the DSP 312 via the flexible mother circuit 318. The sensor package 314 can include one or more different specific types of sensors such as those described in greater detail below. One or more user switches 310 (e.g., on/off, volume, mic directional settings) are electrically coupled to the DSP 312 via the flexible mother circuit 318.

An audio output device 316 is electrically connected to the DSP 312 via the flexible mother circuit 318. In some embodiments, the audio output device 316 comprises a speaker (coupled to an amplifier). In other embodiments, the audio output device 316 comprises an amplifier coupled to an external receiver 320 adapted for positioning within an ear of a wearer. The external receiver 320 can include an electroacoustic transducer, speaker, or loud speaker. The hearing assistance device 200 may incorporate a communication device 308 coupled to the flexible mother circuit 318 and to an antenna 302 directly or indirectly via the flexible mother circuit 318. The communication device 308 can be a Bluetooth® transceiver, such as a BLE (Bluetooth® low energy) transceiver or other transceiver (e.g., an IEEE 802.11 compliant device). The communication device 308 can be configured to communicate with one or more external devices, such as those discussed previously, in accordance with various embodiments. In various embodiments, the communication device 308 can be configured to communicate with an external visual display device such as a smart phone, a video display screen, a tablet, a computer, or the like.

In various embodiments, the hearing assistance device 200 can also include a control circuit 322 and a memory storage device 324. The control circuit 322 can be in electrical communication with other components of the device. The control circuit 322 can execute various operations, such as those described herein. The control circuit 322 can include various components including, but not limited to, a microprocessor, a microcontroller, an FPGA (field-programmable gate array) processing device, an ASIC (application specific integrated circuit), or the like. The memory storage device 324 can include both volatile and non-volatile memory. The memory storage device 324 can include ROM, RAM, flash memory, EEPROM, SSD devices, NAND chips, and the like. The memory storage device 324 can be used to store data from sensors as described herein and/or processed data generated using data from sensors as described herein, including, but not limited to, information regarding exercise regimens, performance of the same, visual feedback regarding exercises, and the like.

Figure 4:
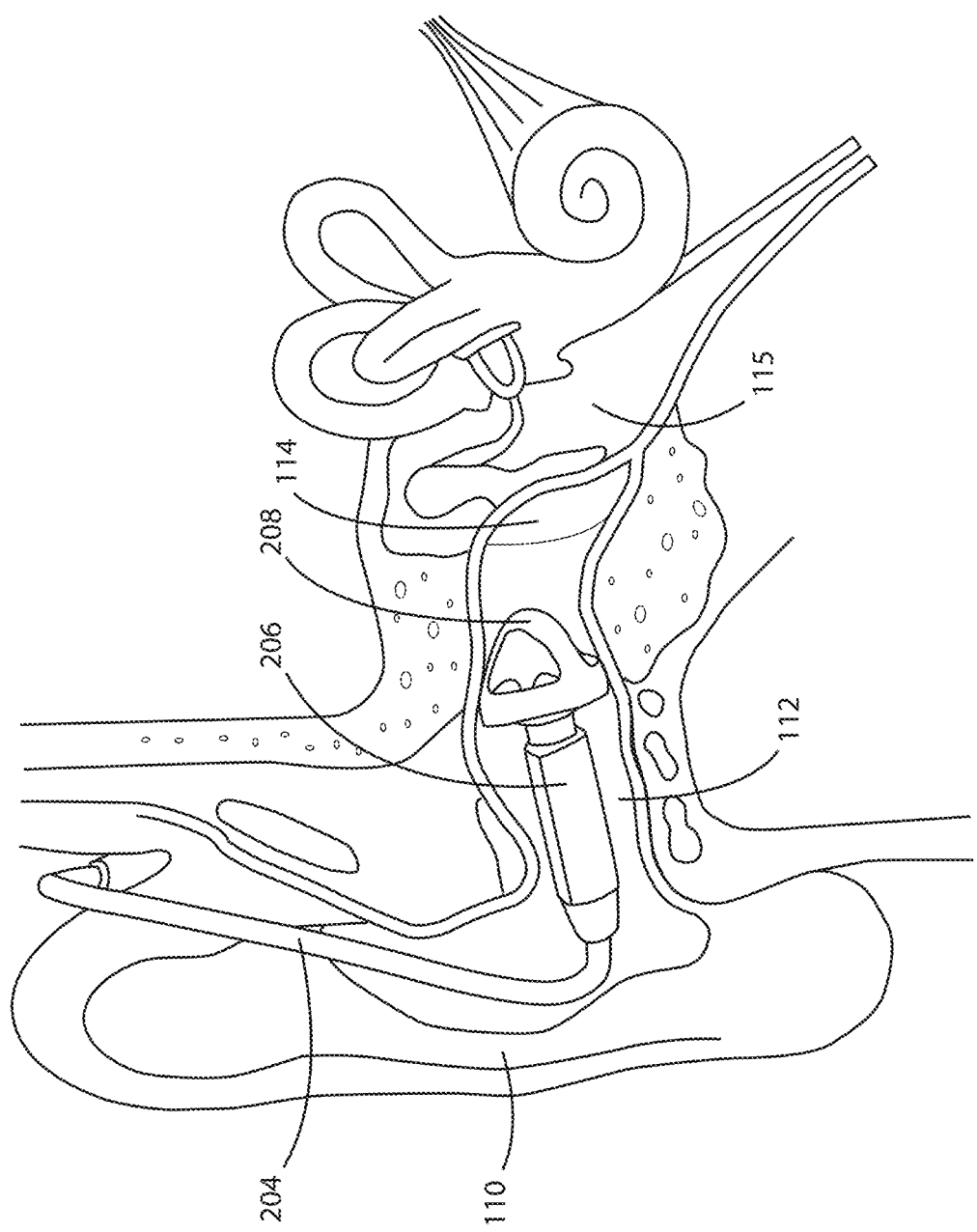
FIG. 4 is a schematic view of a hearing assistance device disposed within the ear of a subject in accordance with various embodiments herein.

As mentioned with regard to FIG. 2, the hearing assistance device 200 shown in FIG. 2 is a receiver-in-canal type device and thus the receiver is designed to be placed within the ear canal. Referring now to FIG. 4, a schematic view is shown of a hearing assistance device disposed within the ear of a subject in accordance with various embodiments herein. In this view, the receiver 206 and the earbud 208 are both within the ear canal 112, but do not directly contact the tympanic membrane 114. The hearing assistance device housing is mostly obscured in this view behind the pinna 110, but it can be seen that the cable 204 passes over the top of the pinna 110 and down to the entrance to the ear canal 112.

While FIG. 4 shows a single hearing assistance device, it will be appreciated that subjects can utilize two hearing assistance devices, such as one for each ear. In such cases, the hearing assistance devices and sensors therein can be disposed on opposing lateral sides of the subject's head. In specific, the hearing assistance devices and sensors therein can be disposed in a fixed position relative to the subject's head. In some embodiments, the hearing assistance devices and sensors therein can be disposed within opposing ear canals of the subject. In some embodiments, the hearing assistance devices and sensors therein can be disposed on or in opposing ears of the subject. The hearing assistance devices and sensors therein can be spaced apart from one another by a distance of at least 3, 4, 5, 6, 8, 10, 12, 14, or 16 centimeters and less than 40, 30, 28, 26, 24, 22, 20 or 18 centimeters, or by a distance falling within a range between any of the foregoing.

Systems herein, and in particular components of systems such as hearing assistance devices herein, can include sensors (such as part of a sensor package 314) to detect movements of the subject wearing the hearing assistance device. Exemplary sensors are described in greater detail below. For example, movements (motion) detected can include forward/back movements, up/down movements, and rotational movements in the vertical plane. In various embodiments herein, subjects can wear two hearing assistance devices. The two hearing assistance devices can be paired to one another as a binaural set and can directly communicate with one another. Movements detected, amongst others, can also include side-to-side movements and rotational movements in the horizontal plane. As described above, embodiments of systems herein, such as hearing assistance devices, can track the motion or movement of a subject using motion sensors associated with the hearing assistance devices and/or associated with accessory devices. The head position and head motion of the subject can be tracked. The posture and change in posture of the subject can be tracked. The acceleration associated with movements of the subject can be tracked.

Figure 5:
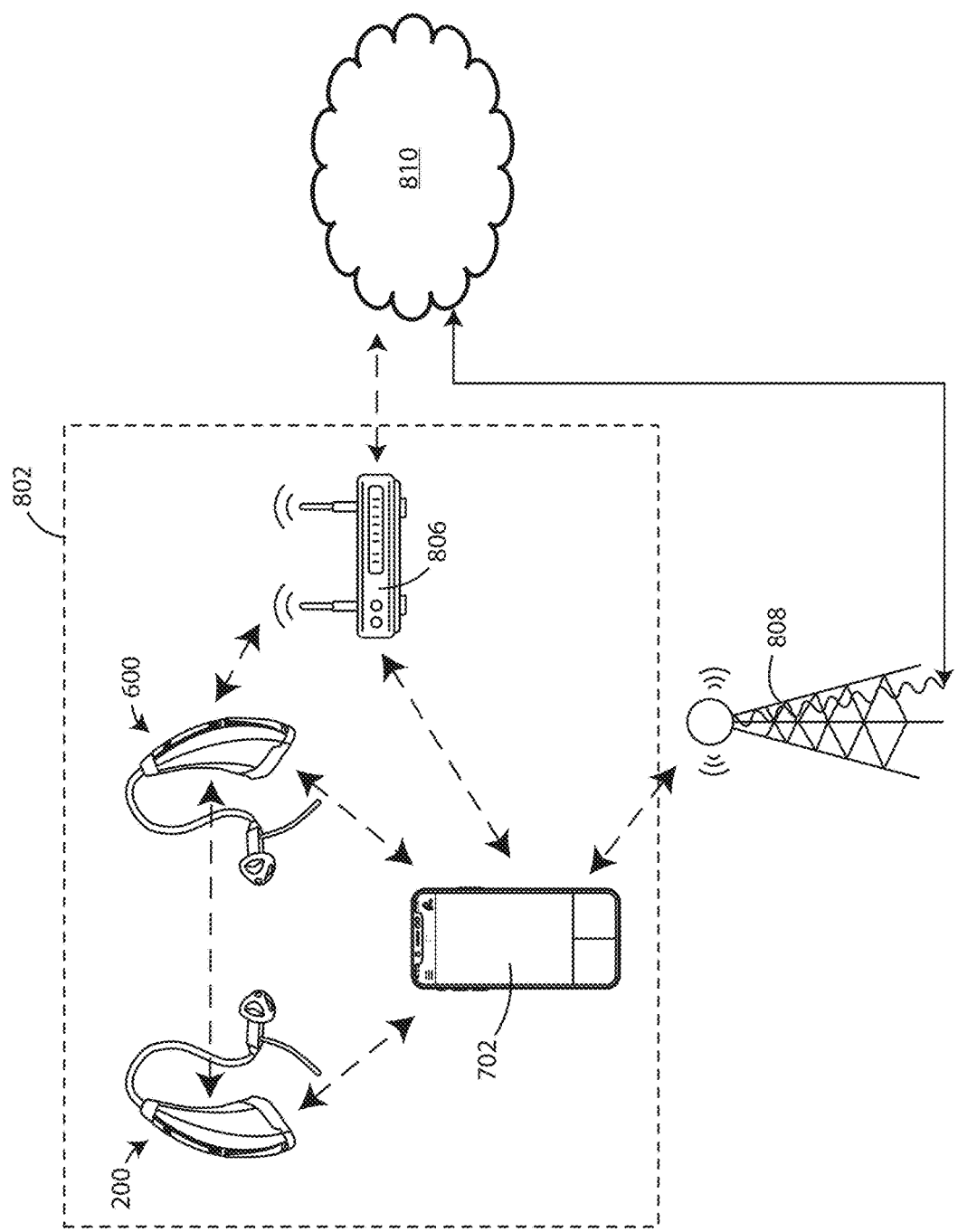
FIG. 5 is a schematic diagram of data and/or electronic signal flow as part of a system in accordance with various embodiments herein.

System including Ear-Wearable Devices and Gateway Device (FIG. 5)

FIG. 5 is a schematic diagram of data and/or electronic signal flow as part of a system in accordance with various embodiments herein. A user wearing a hearing assistance device 200 may also have a gateway device 702. A gateway device is a portable device with access to network resources, such as a cellular network or another wide area network, and the ability to communicate wirelessly with the ear-wearable device. Examples of a gateway device include a smart phone, computer tablet, or laptop computer, cellular telephone, personal digital assistant, personal computer, streaming device, wide area network device, personal area network device, remote microphone, smart watch, home monitoring device, internet gateway, hearing device programmer, smart glasses, a captioning device, and combinations thereof, or the like. Hardware components consistent with various gateway devices are described in U.S. Publ. Appl. No. 2018/0341582, the content of which is herein incorporated by reference. Hardware components, software components, and options for functionality of the system are described in co-pending provisional patent application filed on the even date herewith titled "Automatic Transcription using Ear-Wearable Device," having U.S. application Ser. No. 16/732,756, the content of which is incorporated herein by reference.

The hearing assistance device 200 is worn in a fixed position relative to the user's head. As a result, at most times it is easily accessible to the user. It is also possible for the user to have or wear an accessory device, such as a smart watch. Some accessory devices can be worn so that they are fixed in relation to the user's body, such as a smart watch or smart glasses. A fixed relationship to the user's body allows the accessory device to be easily accessible to the user. The fixed relationship also enables the accessory device to include a sensor that can gather sensor data about the user and the user's movement. Accessory devices herein can include, but are not limited to, a smart phone, cellular telephone, personal digital assistant, personal computer, streaming device, wide area network device, personal area network device, remote microphone, smart watch, home monitoring device, internet gateway, hearing aid accessory, TV streamer, wireless audio streaming device, landline streamer, remote control, Direct Audio Input (DAI) gateway, audio gateway, telecoil receiver, hearing device programmer, charger, drying box, smart glasses, a captioning device, a wearable or implantable health monitor, and combinations thereof, or the like. Hardware components consistent with various accessory devices are described in U.S. Publ. Appl. No. 2018/0341582, previously incorporated by reference.

It will be appreciated that data and/or signals can be exchanged between many different components in accordance with embodiments herein. Referring now to FIG. 5, a schematic view is shown of data and/or signal flow as part of a system in accordance with various embodiments herein. In a first location 802, a subject (not shown) can have a first hearing assistance device 200 and a second hearing assistance device 600. Each of the hearing assistance devices 200, 600 can include sensor packages as described herein including, for example, a motion sensor. The hearing assistance devices 200, 600 and sensors therein can be disposed on opposing lateral sides of the subject's head. The hearing assistance devices 200, 600 and sensors therein can be disposed in a fixed position relative to the subject's head. The hearing assistance devices 200, 600 and sensors therein can be disposed within opposing ear canals of the subject. The hearing assistance devices 200, 600 and sensors therein can be disposed on or in opposing ears of the subject. The hearing assistance devices 200, 600 and sensors therein can be spaced apart from one another by a distance of at least 3, 4, 5, 6, 8, 10, 12, 14, or 16 centimeters and less than 40, 30, 28, 26, 24, 22, 20 or 18 centimeters, or by a distance falling within a range between any of the foregoing.

In various embodiments, data and/or signals can be exchanged directly between the first hearing assistance device 200 and the second hearing assistance device 600. Data and/or signals can be exchanged wirelessly using various techniques including inductive techniques (such as near-field magnetic induction—NFMI), 900 MHz communications, 2.4 GHz communications, communications at another frequency, FM, AM, SSB, BLUETOOTH™, Low Energy BLUETOOTH™, Long Range BLUETOOTH™, IEEE 802.11(wireless LANs) Wi-Fi, 802.15(WPANs), 802.16(WiMAX), 802.20, and cellular protocols including, but not limited to CDMA and GSM, ZigBee, and ultra-wideband (UWB) technologies. Such protocols support radio frequency communications and some support infrared communications. It is possible that other forms of wireless communications can be used such as ultrasonic, optical, and others. It is understood that the standards which can be used include past and present standards. It is also contemplated that future versions of these standards and new future standards may be employed without departing from the scope of the present subject matter.

A gateway device 702 such as a smart phone, smart watch, internet gateway, or the like, can also be disposed within the first location 802. The gateway device 702 can exchange data and/or signals with one or both of the first hearing assistance device 200 and the second hearing assistance device 600 and/or with an accessory to the hearing assistance devices (e.g., a remote microphone, a remote control, a phone streamer, etc.).

Data and/or signals can be exchanged between the gateway device 702 and one or both of the hearing assistance devices (as well as from a gateway device to another location or device) using various techniques including, but not limited to inductive techniques (such as near-field magnetic induction—NFMI), 900 MHz communications, 2.4 GHz communications, communications at another frequency, FM, AM, SSB, BLUETOOTH™, Low Energy BLUETOOTH™, Long Range BLUETOOTH™, IEEE 802.11(wireless LANs) Wi-Fi, 802.15(WPANs), 802.16 (WiMAX), 802.20, and cellular protocols including, but not limited to CDMA and GSM, ZigBee, and ultra-wideband (UWB) technologies. Such protocols support radio frequency communications and some support infrared communications. It is possible that other forms of wireless communications can be used such as ultrasonic, optical, and others. It is also possible that forms of wireless mesh networks may be utilized to support communications between various devices, including devices worn by other individuals. It is understood that the standards which can be used include past and present standards. It is also contemplated that future versions of these standards and new future standards may be employed without departing from the scope of the present subject matter.

The gateway device 702 can also exchange data across a data network to the cloud 810, such as through a wireless signal connecting with a local gateway device, such as over a mesh network, such as a network router 806 or through a wireless signal connecting with a cell tower 808 or similar communications tower. In some embodiments, the gateway device can also connect to a data network to provide communication to the cloud 810 through a direct wired connection.

In some embodiments, a third-party recipient (such as a family member, a friend, a designated alert recipient, a care provider, or the like) can receive information from devices at the first location 802 remotely at a second location through a data communication network such as that represented by the cloud 810. The received information can include, but is not limited to, physiological data, environmental data relative to the location of the subject, contextual data, location data of the subject, map data indication the location of the subject, and the like. In some embodiments, received information can be provided to the third-party recipient 816 in real time.

As used herein, the term "physiological data" refers to information regarding the wearer's physiological state, e.g., at least one of a determined fall risk, inertial sensor data, heart rate information, blood pressure information, drug concentration information, blood sugar level, body hydration information, neuropathy information, blood oximetry information, hematocrit information, body temperature, age, sex, gait or postural stability attribute, vision, hearing, eye movement, neurological activity, or head movement. In one or more embodiments, physiological data can include heart rate and changes in heart rate. Further, in one or more embodiments, the physiological data can include one or more inputs provided by the wearer in response to one or more queries.

Figure 6:
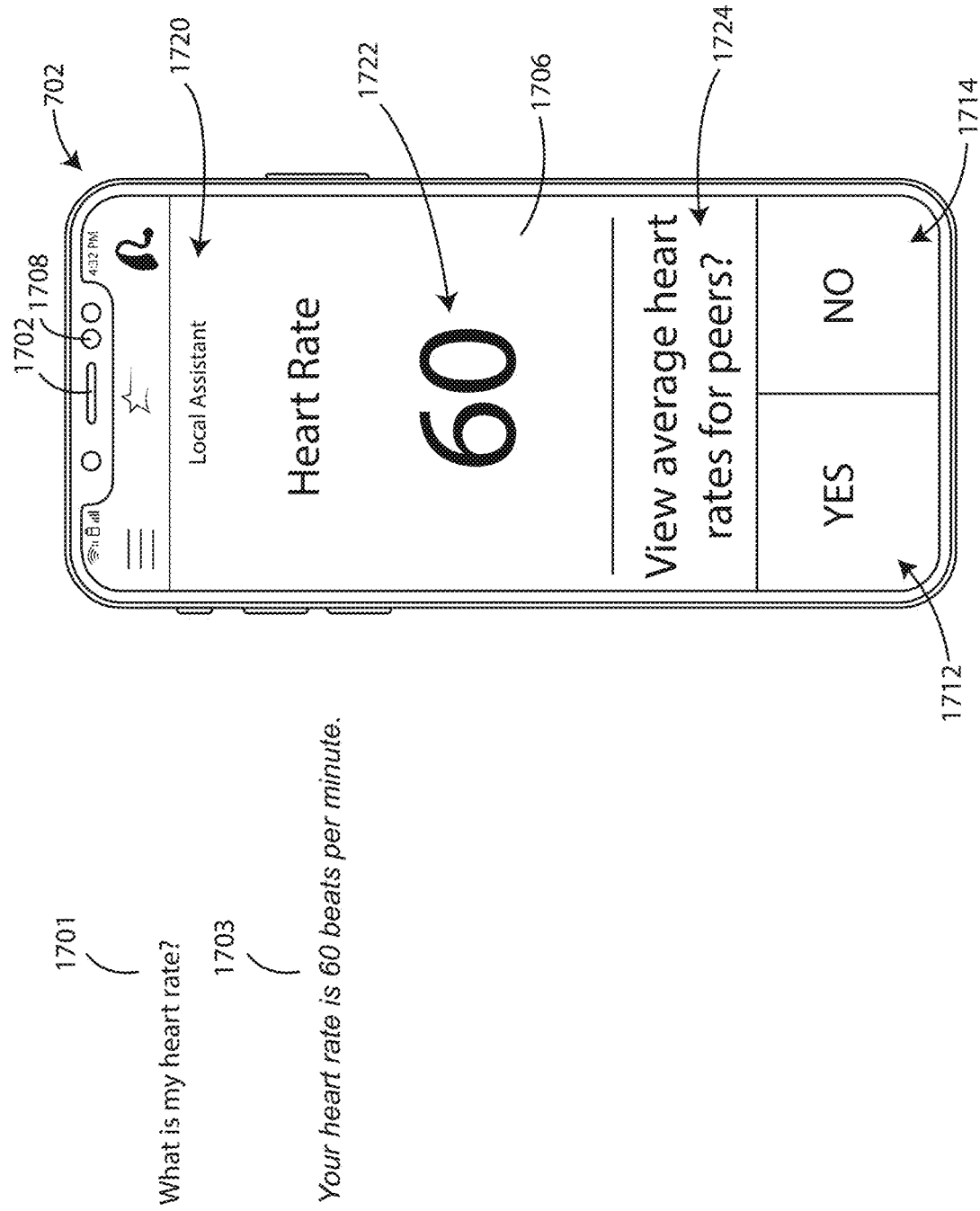
FIG. 6 is a schematic view of a gateway device and elements of a display screen thereof in accordance with various embodiments herein.

Local Assistant Interface (FIG. 6)

FIG. 6 is a schematic view of a gateway and elements of a display screen thereof in accordance with various embodiments herein. Many visual display options are contemplated herein. In specific, visual elements of the display screen 1706 are shown in accordance with various embodiments herein. The gateway device 702 can include a speaker 1702. The gateway device 702 can generate and/or display a user interface and the display screen 1706 can be a touchscreen to receive input from the subject/user. In some embodiments, the gateway device 702 can include a camera 1708.

The display screen 1706 visual elements can include a local assistant system 1720. The display screen 1706 can be used to present information to the user in response to a query that the user has posed to the local assistant system 1720.

In one example, a user asks the local assistant a query 1701, "What is my heart rate?" In some cases, this query can be handled locally without the need to access network resources, using stored data on the gateway device or sensor input to the gateway device. The local assistant system 1720 can audibly state an audio response 1703, "Your heart rate is 60 beats per minute." In addition, or in the alternative, the display screen can show the user's heart rate 1722. The display screen 1706 visual elements can include a query to the subject/user regarding additional information that the user might want to review related to the user's query, such as asking if the user would like to see average heart rate information for the user's peers on the gateway device 1724. The display screen 1706 visual element can also include virtual buttons 1712, 1714 in order to allow the subject/user to indicate whether the user would like to see the additional information. Average heart rate information for peers is an example of information that may not be available locally. As a result, the local assistant would communicate wirelessly with network resources to obtain the information.

Sensors

Systems herein can include one or more sensor packages to provide data in order to answer queries posed by the user to the local assistant system. For example, users may query the local assistant about health data that is collected by sensors. Sensors can also determine aspects including, but not limited to, tracking movement of a subject and tracking head position of the subject. Such movement can be detected and used as user input to the local assistant system. For example, a head nod can indicate that the user would like to answer yes to a question asked by the local assistant.

The sensor package can comprise one or a multiplicity of sensors. In some embodiments, the sensor packages can include one or more motion sensors amongst other types of sensors. Motion sensors herein can include inertial measurement units (IMU), accelerometers, gyroscopes, barometers, altimeters, and the like. Motions sensors can be used to track movement of a subject in accordance with various embodiments herein.

In some embodiments, an IMU is present in an ear-wearable device. In some embodiments, an IMU is present in each of two ear-wearable devices that are worn together by a user. In some embodiments, the motion sensors can be disposed in a fixed position with respect to the head of a subject, such as worn on or near the head or ears. In some embodiments, the motion sensors can be disposed associated with another part of the body such as on a wrist, arm, or leg of the subject.

Sensor packages herein can also include one or more of a magnetometer, microphone, acoustic sensor, electrocardiogram (ECG), electroencephalography (EEG), eye movement sensor (e.g., electrooculogram (EOG) sensor), myographic potential electrode (EMG), heart rate monitor, pulse oximeter, blood pressure monitor, blood glucose monitor, thermometer, cortisol level monitor, and the like.

In some embodiments, the sensor package can be part of a hearing assistance device. However, in some embodiments, the sensor packages can include one or more additional sensors that are external to a hearing assistance device. The one or more additional sensors can comprise one or more of an IMU, accelerometer, gyroscope, barometer, magnetometer, an acoustic sensor, eye motion tracker, EEG or myographic potential electrode (e.g., EMG), heart rate monitor, pulse oximeter, blood pressure monitor, blood glucose monitor, thermometer, and cortisol level monitor. For example, the one or more additional sensors can include a wrist-worn or ankle-worn sensor package, a sensor package supported by a chest strap, a sensor package integrated into a medical treatment delivery system, or a sensor package worn inside the mouth.

The sensor package of a hearing assistance device can be configured to sense motion of the wearer. Data produced by the sensor(s) of the sensor package can be operated on by a processor of the device or system.

According to various embodiments, the sensor package can include one or more of an IMU, and accelerometer (3, 6, or 9 axis), a gyroscope, a barometer, an altimeter, a magnetometer, an eye movement sensor, a pressure sensor, an acoustic sensor, a heart rate sensor, an electrical signal sensor (such as an EEG, EMG or ECG sensor), a temperature sensor, a blood pressure sensor, an oxygen saturation sensor, a blood glucose sensor, a cortisol level sensor, an optical sensor, and the like.

As used herein the term "inertial measurement unit" or "IMU" shall refer to an electronic device that can generate signals related to a body's specific force and/or angular rate. IMUs herein can include one or more of an accelerometer and gyroscope (3, 6, or 9 axis) to detect linear acceleration and a gyroscope to detect rotational rate. In some embodiments, an IMU can also include a magnetometer to detect a magnetic field. In some embodiments, an IMU can also include a barometer.

The eye movement sensor may be, for example, an electrooculographic (EOG) sensor, such as an EOG sensor disclosed in commonly owned U.S. Pat. No. 9,167,356, which is incorporated herein by reference. The pressure sensor can be, for example, a MEMS-based pressure sensor, a piezo-resistive pressure sensor, a flexion sensor, a strain sensor, a diaphragm-type sensor and the like.

According to a least some embodiments, the wireless radios of one or more of the right hearing assistance device, the left hearing assistance device, and a gateway device may be leveraged to gauge the strength of the electromagnetic signals, received at one or more the wireless devices, relative to the radio output at one or more of the wireless devices.

The temperature sensor can be, for example, a thermistor (thermally sensitive resistor), a resistance temperature detector, a thermocouple, a semiconductor-based sensor, an infrared sensor, or the like.

The blood pressure sensor can be, for example, a pressure sensor. The heart rate sensor can be, for example, an electrical signal sensor, an acoustic sensor, a pressure sensor, an infrared sensor, an optical sensor, or the like.

The oxygen saturation sensor can be, for example, an optical sensor, an infrared sensor, or the like.

The blood glucose sensor can be, for example, an electrochemical HbA1c sensor, or the like.

The electrical signal sensor can include two or more electrodes and can include circuitry to sense and record electrical signals including sensed electrical potentials and the magnitude thereof (according to Ohm's law where V=IR) as well as measure impedance from an applied electrical potential.

The sensor package can include one or more sensors that are external to the hearing assistance device. In addition to the external sensors discussed hereinabove, the sensor package can comprise a network of body sensors (such as those listed above) that sense movement of a multiplicity of body parts (e.g., arms, legs, torso).

It should be noted that, as used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

It should also be noted that, as used in this specification and the appended claims, the phrase "configured" describes a system, apparatus, or other structure that is constructed or configured to perform a particular task or adopt a particular configuration. The phrase "configured" can be used interchangeably with other similar phrases such as arranged and configured, constructed and arranged, constructed, manufactured and arranged, and the like.

All publications and patent applications in this specification are indicative of the level of ordinary skill in the art to which this invention pertains. All publications and patent applications are herein incorporated by reference to the same extent as if each individual publication or patent application was specifically and individually indicated by reference.

As used herein, the recitation of numerical ranges by endpoints shall include all numbers subsumed within that range (e.g., 2 to 8 includes 2.1, 2.8, 5.3, 7, etc.).

The headings used herein are provided for consistency with suggestions under 37 CFR 1.77 or otherwise to provide organizational cues. These headings shall not be viewed to limit or characterize the invention(s) set out in any claims that may issue from this disclosure. As an example, although the headings refer to a "Field," such claims should not be limited by the language chosen under this heading to describe the so-called technical field. Further, a description of a technology in the "Background" is not an admission that technology is prior art to any invention(s) in this disclosure. Neither is the "Summary" to be considered as a characterization of the invention(s) set forth in issued claims.

The embodiments described herein are not intended to be exhaustive or to limit the invention to the precise forms disclosed in the following detailed description. Rather, the embodiments are chosen and described so that others skilled in the art can appreciate and understand the principles and practices. As such, aspects have been described with reference to various specific and preferred embodiments and techniques. However, it should be understood that many variations and modifications may be made while remaining within the spirit and scope herein.

The invention claimed is:

1. A method of a local assistant system responding to voice input using an ear-wearable device and a gateway device, wherein the ear-wearable device comprises a first speaker, a first microphone, a first processor, a first memory storage, and a first wireless communication device, wherein the gateway device comprises a gateway processor, a gateway memory storage, and a first gateway wireless communication device for communicating with the ear-wearable device, the method comprising:
   detecting a wake-up signal with detection circuitry, wherein the wake-up signal comprises one or more keywords in an audio input stream;
   after detecting the wake-up signal, receiving, at the local assistant system, a first voice input communicating a first query content;
   recognizing speech within the first voice input to determine the first query content, using speech recognition circuitry, wherein the speech recognition circuitry resides in the gateway device;
   generating speech output to the first speaker of the ear-wearable device,
   determining whether the first query content matches one of a plurality of locally-handled user inputs of an input database stored in a non-transitory computer-readable memory;
   taking a local responsive action if the first audio input matches one of the locally-handled user inputs; and
   transmitting at least a portion of the first query content over a wireless network to a network resource if the first audio input does not match one of the locally-handled user inputs.

2. The method of claim 1, the gateway device further comprising:
   a second gateway wireless communication device for communicating with a pervasive wireless network, wherein the input database resides in the gateway device.

3. The method of claim 1, further comprising:
   detecting, at a sensor of the ear-wearable device, biological information about a wearer of the ear-wearable device;
   wirelessly transmitting, by the ear-wearable device, to the gateway device, the biological information for storage at the gateway memory storage;
   identifying the biological information on the gateway memory storage in response to the first voice input, wherein the first query content is a bioinformatic request to report the biological information to the wearer, wherein the bioinformatic request is a locally-handled user input;
   formulating, by the gateway device, content for an audio response reporting the biological information;
   wirelessly transmitting an audio response to the ear-wearable device; and
   playing the audio response on the first speaker of the ear-wearable device to provide the biological information to the wearer.

4. The method of claim 1, wherein the ear-wearable device comprises an inertial motion sensor in communication with the detection circuitry.

5. The method of claim 1, wherein the one or more keywords in the audio input stream indicate that a user has misplaced an item, and the local assistant system is configured to assist the user in locating the item.

6. The method of claim 1, the local responsive action further comprising:
   obtaining locally-available information and providing an audio response on the ear-wearable device to provide information to a user; or
   acting upon the ear-wearable device, a local smart device, or another local device.

7. The method of claim 1, wherein the locally-handled user inputs comprise:
   a request to report on hardware functionality,
   a request to check battery power of the ear-wearable device,
   a request to check battery power of a cellular phone,
   a request to check ear-wearable device functionality,
   a request to adjust a setting of a local device,
   a request to adjust a setting of the ear-wearable device,
   a request for the ear-wearable device to block a sound,
   a request to adjust a volume of the ear-wearable device,
   a request for the ear-wearable device to wirelessly pair to another device,
   a request for a phone to wirelessly pair to another device,
   a request to provide information based on locally-stored data,
   a request to provide a reminder from a calendar stored on a cellular phone,
   a request to provide content from a list, or
   a request to provide activity data.

8. The method of claim 1, wherein the local assistant operates on the ear-wearable device, on the ear-wearable device and on a second ear-wearable device, on a gateway device that is coupled to the ear-wearable device, or on a combination of these.

9. A method of a local assistant system responding to voice input using an ear-wearable device and a gateway device, wherein the ear-wearable device comprises a first speaker, a first microphone, a first processor, a first memory storage, a first wireless communication device, and a sensor configured to detect biological information about a wearer of the ear-wearable device, wherein the gateway device comprises a gateway processor, a gateway memory storage, and a first gateway wireless communication device for communicating with the ear-wearable device, the method comprising:
   detecting a wake-up signal, wherein the wake-up signal comprises one or more keywords in an audio input stream;
   after detecting the wake-up signal, receiving, at the local assistant system, a first voice input communicating a first query content;

recognizing speech within the first voice input to determine the first query content;
generating speech output to the first speaker of the ear-wearable device;
determining the first query content matches one of the locally-handled user inputs of an input database stored in a non-transitory computer-readable memory;
taking a local responsive action if the first audio input matches one of the locally-handled user inputs; and
transmitting at least a portion of the first query content over a wireless network to a network resource if the first audio input does not match one of the locally-handled user inputs;
wirelessly transmitting, by the ear-wearable device, to the gateway device, the biological information for storage at the gateway memory storage;
identifying the biological information on the gateway memory storage in response to the first voice input, wherein the first query content is a bioinformatic request to report the biological information to the wearer, wherein the bioinformatic request is a locally-handled user input;
formulating, by the gateway device, content for an audio response reporting the biological information;
wirelessly transmitting an audio response to the ear-wearable device; and
playing the audio response on the first speaker of the ear-wearable device to provide the biological information to the wearer.

10. A method of a local assistant system responding to voice input using an ear-wearable device, wherein the ear-wearable device comprises a first speaker, a first microphone, a first processor, a first memory storage, and a first wireless communication device, the method comprising:
detecting a wake-up signal, wherein the wake-up signal comprises one or more keywords in an audio input stream;
after detecting the wake-up signal, receiving at the local assistant system, a first voice input communicating a first query content;
recognizing speech within the first voice input to determine the first query content;
generating speech output to the first speaker of the ear-wearable device;
an input database stored in a non-transitory computer-readable memory comprising locally-handled user inputs;
determining whether the first query content matches one of the locally-handled user inputs of an input database stored in a non-transitory computer-readable memory;
taking a local responsive action if the first audio input matches one of the locally-handled user inputs; and
transmitting at least a portion of the first query content over a wireless network to a network resource if the first audio input does not match one of the locally-handled user inputs;
wherein the one or more keywords in the audio input stream indicate that a user has misplaced an item, and the local assistant system is configured to assist the user in locating the item.

11. The method of claim 10, the local assistant system further comprising:
a gateway device comprising a gateway processor, a gateway memory storage, a first gateway wireless communication device for communicating with the ear-wearable device, and a second gateway wireless communication device for communicating with a pervasive wireless network;
wherein the input database resides in the gateway device.

12. The method of claim 10, wherein the wake-up signal comprises the plurality of taps on the ear-wearable device being detected by the first microphone or by an inertial motion sensor in the ear-wearable device.

13. The method of claim 10, wherein taking the local responsive action comprises:
obtaining locally-available information and providing an audio response on the ear-wearable device to provide the locally-available information to a user; or
acting upon the ear-wearable device or another local device.

14. A method of a local assistant system responding to voice input using an ear-wearable device, wherein the ear-wearable device comprises a first speaker, a first microphone, a first processor, a first memory storage, and a first wireless communication device, the method comprising:
detecting a wake-up signal using detection circuitry, wherein the wake-up signal comprises a vibration sequence comprising a plurality of taps on the ear-wearable device or a keyword in an audio input stream;
after detecting the wake-up signal, receiving, at the local assistant system, a first voice input communicating a first query content;
recognizing speech within the first voice input to determine the first query content,
generating speech output to the first speaker of the ear-wearable device,
an input database stored in computer-readable memory comprising locally-handled user inputs, wherein the locally-handled user inputs comprise a request for the ear-wearable device to block a sound;
determining whether the first query content matches one of the locally-handled user inputs of an input database stored in a non-transitory computer-readable memory;
taking a local responsive action if the first audio input matches one of the locally-handled user inputs; and
transmitting at least a portion of the first query content over a wireless network to a network resource if the first audio input does not match one of the locally-handled user inputs.

15. The method of claim 14, further comprising:
a gateway device comprising a gateway processor, a gateway memory storage, a first gateway wireless communication device for communicating with the ear-wearable device, and a second gateway wireless communication device for communicating with a pervasive wireless network;
wherein the input database resides in the gateway device.

16. The method of claim 15, further comprising:
detecting, at a sensor of the ear-wearable device, biological information about a wearer of the ear-wearable device;
wirelessly transmitting, by the ear-wearable device, to the gateway device, the biological information for storage at the gateway memory storage;
identifying the biological information on the gateway memory storage in response to the first voice input, wherein the first query content is a bioinformatic request to report the biological information to the wearer, wherein the bioinformatic request is a locally-handled user input;
formulating, by the gateway device, content for an audio response reporting the biological information;

wirelessly transmitting an audio response to the ear-wearable device; and playing the audio response on the first speaker of the ear-wearable device to provide the biological information to the wearer.

17. The method of claim 14, wherein the ear-wearable device comprises an inertial motion sensor in communication with the detection circuitry.

18. The method of claim 14, wherein the wake-up signal comprises the plurality of taps on the ear-wearable device being detected by the first microphone or by an inertial motion sensor in the ear-wearable device.

19. The method of claim 14, the local responsive action further comprising:

obtaining locally-available information and providing an audio response on the ear-wearable device to provide information to a user; or acting upon the ear-wearable device, a local smart device, or another local device.

20. The method of claim 14 wherein the locally-handled user inputs further comprise:

a request to report on hardware functionality, a request to check battery power of the ear-wearable device, a request to check battery power of a cellular phone, a request to check ear-wearable device functionality, a request to adjust a setting of a local device, a request to adjust a setting of the ear-wearable device, a request to adjust a volume of the ear-wearable device, a request for the ear-wearable device to wirelessly pair to another device, a request for a phone to wirelessly pair to another device, a request to provide information based on locally-stored data, a request to provide a reminder from a calendar stored on a cellular phone, a request to provide content from a list, or a request to provide activity data.

\* \* \* \* \*